United States Patent Office 3,038,924
Patented June 12, 1962

3,038,924
BIS(DIMETHYLAMIDO)PENTACHLOROPHENYL-PHOSPHATE AND THE THIOLOPHENYL PHOSPHATE DERIVATIVE THEREOF
Cornelis Johannes Schoot, Eindhoven, and Marinus Johannes Koopmans and Bernardus Gerhardus van den Bos, Weesp, Netherlands, assignors to North American Philips Company, Inc., New York, N.Y., a corporation of Delaware
No Drawing. Filed Feb. 16, 1959, Ser. No. 793,294
Claims priority, application Netherlands Feb. 24, 1958
3 Claims. (Cl. 260—461)

It is known that a compound of the general formula

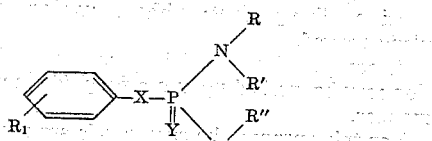

in which X and Y represent oxygen or sulphur, R, R', R" and R'" represent hydrogen or alkyl groups and $R_1$ represents at will one or more halogen atoms and/or alkyl groups, may be used as an active constituent in combination with a contact insecticide of the formula

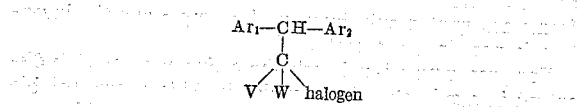

in which $Ar_1$ and $Ar_2$ represent aromatic groups which may carry equal or different, non-salt-forming substituents and in which V and W represent halogen or hydrogen, in a preparation for combating vermin and, in particular, insects.

Further it is known that compounds of the general formula

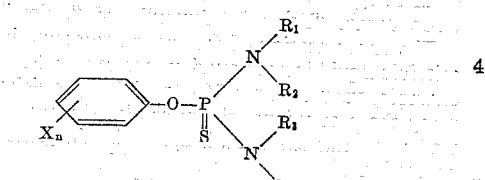

in which X represents chlorine or bromine, $R_1$ represents an alkyl group and $R_2$, $R_3$ and $R_4$ represent hydrogen or an alkyl-, aralkyl- or cycloalkyl group and $n$ represents an integer of 3 to 5 are effective against red spider, greenfly and "Mexican bean beetle," and against moulds such as bean mildew.

Further it has been described that compounds of the general formula

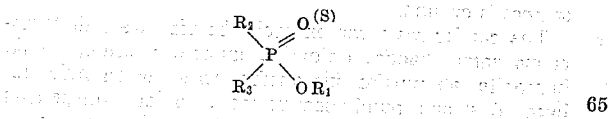

in which $R_1$ represents a negatively substituted phenyl-group, for example a nitrophenyl-, carbethoxyphenyl-, carbethoxynitrophenyl-, aldehydophenyl- or chlorophenyl group, and $R_2$ and $R_3$ represent alkoxy- or alkyl groups or rests of aliphatic amines, have insecticide properties.

A group of diamidophosphates and diamidothiophosphates has now been found to be very effective against moulds, in particular against mildew, and moreover against insects.

The present invention relates to a method of producing a preparation for combating moulds and in particular mildew, characterized in that a compound of the general formula

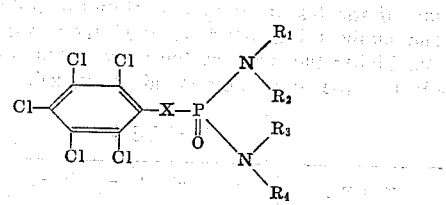

in which X represents an oxygen or sulphur atom, $R_1$, $R_2$, $R_3$ and $R_4$ each represent an alkyl group with 1 to 5 carbon atoms, is mixed with or dissolved in inert, solid or fluid carrier materials, if desired, with the addition of surface-active substances, dispersion agents and/or stickers and/or preparations containing these compounds.

In particular compounds in which

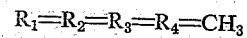

$$R_1=R_2=R_3=R_4=CH_3$$

are highly effective against mildew.

More particularly bis(dimethylamido)pentachlorophenyl compounds according to the invention proved highly effective against mildew.

As is known, a large number of compounds effective against moulds have been described which, however, do not enter into account in practice for combatting moulds on plants due to their greater or lesser degree of phytotoxicity. They would cause too much damage to the plants.

It has now been found that the pentachlorophenyl derivatives according to the invention are not at all or substantially not phytotoxic and consequently particularly suitable for combating moulds, and in particular mildew, on living plants such as barley, apples and grapes.

The compounds were tested in the following manner as to their fungicidal activity.

Young plants of barley (*Hordeum vulgare*) were cultivated at a temperature of 15° C. to 18° C. in small flower pots until approximately 7 cms. tall. Subsequently they were sprayed with acetonic solutions having different contents of the compound to be tested. The solutions contained 1000, 100 and 10 parts by weight respectively of active compound to a million parts by weight of acetone. Seven plants in one pot were simultaneously sprayed with 0.2 ccm. of the solution. Instantly after spraying the plants were dusted with vigorous conidia of *Erysiphe graminis*. This was effected by simultaneously placing the pots of the whole test series under a spacious bell and distributing the conidia of the mildew in this space by means of a current of air passing over strongly infected leaves of barley. The whole was left to stand for some time and the conidia deposited evenly on the plants. These plants were subsequently introduced into a space in which the temperature was 18° C. to 20° C. and the relative humidity was approximately 90% under continuous illumination with fluorescent lamps (white light) having an intensity of approximately 3000 luxes. Five days after inoculation, spots of mildew mould had clearly formed on the test plants, which spots sporulated copiously.

The degree of attack of each plant was determined as a figure of the series 0 to 10; 0=no attack, 10 meaning that the whole leaf was covered with dots.

The tests were carried out in threefold, thus obtaining 21 observations per concentration of the tested compound, the results of which observations were added.

Since not all of the compounds could be tested in a single test series, the degree of attack of each plant was invariably compared with that caused by 2,4-dinitro-6-(1'-methylheptyl)-1-phenylcrotonate. Invariably, quantities were determined which result in 50% protection of the plant both in the case of the compound to be tested and of the phenylcrotonate derivative.

As a measure of the activity of a tested compound, the quotient was taken of the quantity of phenylcrotonate and of the tested compound affording 50% protection. The numbers thus found are listed in column $h$ of Table I. The higher the number, the more potent the fungicidal effect of the tested compound concerned.

TABLE I

| Test No. | X | $R_1$ | $R_2$ | $R_3$ | $R_4$ | $h$ |
|---|---|---|---|---|---|---|
| 1 | 0 | $CH_3$ | $CH_3$ | $CH_3$ | $CH_3$ | 10–20 |
| 2 | S | $CH_3$ | $CH_3$ | $CH_3$ | $CH_3$ | 10–20 |
| 3 | 0 | $C_2H_5$ | $C_2H_5$ | $C_2H_5$ | $C_2H_5$ | 0.1 |

In this table, the first column quotes the test number, the second to sixth column quote the substituents X, $R_1$, $R_2$, $R_3$ and $R_4$ respectively and the last column quotes the effect against Erysiphaceae with respect to that of 2,4-dinitro - 6 - (1' -methylheptyl) - 1 - phenylcrotonate (on barley plants) expressed as before. The results show that especially the bis(dimethylamido) compounds according to the invention have a high fungicidal activity in comparison with 2,4-dinitro-6-(1'-methylheptyl)-1-phenylcrotonate, which compound is known as a highly effective fungicide.

The phytotoxicity of the compounds according to the invention has been determined by spraying a solution or suspension of the compounds on a number of plant species. By means of an atomizer an amount of 10 cm.$^3$ of a solution or suspension in acetone of 1% by weight of the compound was sprayed on a surface area of 0.1 m.$^2$ grown over with the plant species. This amount equals to 10 kgs. per hectare of the compound to be tested. After 10 days the results were determined and evaluated as follows:

0=no damage;
1=0–0.1 part of the plants burned;
2=0.1–0.3 part of the plants burned;
3=0.3–0.6 part of the plants burned;
4=0.6–0.9 part of the plants burned;
5=more than 0.9 part of the plants burned;
6=plants dead.

The results of the experiments are given in Table II. Plants used as test species are:

A=Runner bean (*Phaseolus vulgaris*);
B=Tomato (*Solanum lycopersicum*);
C=Oats (*Avena sativa*);
D=Chickweed (*Stellaria media*);
E=Beet (*Beta vulgaris*).

In these experiments 3 compounds of the invention (numbers 1, 2 and 3 of Table I) were compared with a number of compounds analogous to them, but having 1 to 3 chlorine atoms attached to the benzene nucleus. These compounds are:

| code | Compound |
|---|---|
| SP54 | Bis(N.N-dimethylamido)-4-chlorophenylphosphate. |
| SP52 | Bis(N.N-dimethylamido)-4-chlorothiophenylphosphate. |
| SP46 | Bis(N.N-dimethylamido)-2,4,6-trichlorophenylphosphate. |
| SP60 | Bis(N.N-dimethylamido)-2,4-dichlorothiophenylphosphate. |
| SP59 | Bis(N.N-dimethylamido)-2,4,5-trichlorothiophenylphosphate. |

TABLE II

| Compound | Plant species | | | | |
|---|---|---|---|---|---|
| | A | B | C | D | E |
| 1 | 0 | 0 | 0 | 0 | 0 |
| 2 | 1 | 0 | 0 | 0 | 0 |
| 3 | 0 | 0 | 0 | 0 | 0 |
| SP54 | 5 | 6 | 3 | 4 | 4 |
| SP52 | 6 | 6 | 3 | 2 | 5 |
| SP46 | 6 | 6 | 3 | 5 | 6 |
| SP60 | 5 | 6 | 4 | 5 | 6 |
| SP59 | 6 | 6 | 4 | 4 | 6 |

The results gathered in this table clearly show the low phytotoxicity of the compounds of the invention. Thus, in contradistinction to other and analogous compounds, the compounds of the invention can be used to combat fungi on living plants without causing damage to the plants treated.

A compound obtained in accordance with the invention may be worked up into a fungicide in a conventional manner.

For this purpose, the compounds are mixed with or, if desired, dissolved in solid or fluid carrier materials and, if desired, enriched with dispersion agents, emulsifiers or wetting agents. Preparations thus obtained may either as such or emulsified or dispersed in a liquid, for example water, be distributed by spraying, dusting or atomizing them in the air. Among the several preparations entering into account, into which the active compounds are adapted to be worked up, there may be mentioned the so-called miscible oils, wettable powders and dusts. These forms are quoted only by way of example and the invention is not limited thereto.

For preparing miscible oils the active compound is dissolved in a suitable solvent which itself is poorly soluble in water, and an emulsifying agent is added to this solution. Suitable solvents are, for example xylene, toluene, dioxane, petroleum distillates rich in aromatic compounds, for example solvent naphtha, distilled tar oil, further tetraline, cyclohexane or mixtures of these liquids. As emulsifying agents use may be made of alkylphenoxypolyglycol ethers, polyoxyethylene sorbitan esters of fatty acids or polyoxyethylene sorbitol esters of fatty acids. A number of these types of emulsifying agents are known under the trade names "Triton," "Tween" and "Atlox."

The concentration of the active compound in the water-miscible liquid is not bound to narrow limits. It may, for example, vary of from 2% to 50% by weight. Prior to using these solutions, the miscible oils are emulsified in water and this emulsion is sprayed. In general, the concentration of the active compound in these aqueous emulsions is 0.01% to 0.5% by weight.

The wettable powders may be prepared by mixing the active compound with a solid, inert carrier and grinding, as a rule in the presence of a dispersion and/or wetting agent. Before use, the wettable powders are dispersed in a liquid, preferably in water, and the dispersion is atomized. The wettable powder should consist of minute particles, in order to avoid the outlet of the atomizer becoming obstructed. Therefore, it is advisable to use fine powdery material as a carrier. If desired, the mixture of the carrier, the active compound and any auxiliary substances is ground.

The carrier may, for example, be pipe clay, diatomaceous earth, kaolin, dolomite, talcum, gypsum, chalk, bentonite, attapulgite, kieselguhr, celite, wood pulp, tobacco dust or ground coconut shell. Suitable dispersion agents are lignine sulphonates and naphthalene sulphonates. As wetting agents may be used fatty alcohol sulphates, alkylaryl sulphonates or fatty acid condensation products, for example those commercially known as "Igepon."

Also in wettable powders the concentration of the active compounds is not bound to narrow limits. In general, the concentration will be chosen between 10% and 80% by weight.

Dusts may be prepared by applying an active compound as such or dissolved in a solvent onto a solid carrier. When using this preparation it is atomized in a dry or finely powdered condition in the air. Alternatively, these powders may be produced by means of suitable light weight carriers in the manner as stated for producing wettable powders. The carriers may be products referred to before in desciding the production of wettable powders. In general, the concentration of active compounds in the dusting powders is lower than in the wettable powders or miscible oils, but higher than in dispersions or emulsions obtained by diluting wettable powders or miscible oils with liquids. The dusts usually contain 1% to 20% by weight of active compound. To be complete it is to be noted that miscible oils, wettable powders or dusts according to the invention may be produced by mixing two miscible oils (or wettable powders and dusts) each containing one of the active compounds.

A wettable powder may, for example, be produced by mixing 25 parts by weight of bis(N.N-dimethylamido)-pentachlorophenylphosphate, 68 parts by weight of dolomite, 2 parts by weight of oleylamidomethyltaurate and 5 parts by weight of sodiumlignine sulphonate and subsequently grinding to an average particle size less than approximately 10μ.

A dust may, for example, be produced by mixing 3 parts by weight of bis(N.N-dimethylamido)pentachlorophenylphosphate, 7 parts by weight of kieselguhr and 90 parts by weight of dolomite and subsequently grinding to an average particle size less than approximately 10μ.

For producing a miscible oil, for example 10 parts by weight of bis(N.N-dimethylamido)pentachlorophenylphosphate are dissolved in a mixture of 12 parts by weight of dioxane, 6 parts by weight of polyoxyethylene sorbitan fatty acid ester and 72 parts by weight of xylene. On pouring out into water such a miscible oil spontaneously yields fairly stable emulsions.

The compounds according to the invention may, for example, be produced from phosphorousoxychloride, phenol or thiophenol or a phenolate or thiophenolate and a secondary amine. In general, the production from phenol or thiophenol or a phenolate or thiophenolate and bis(dialkylamido) phosphorylchloride yields satisfactory results. In the last-mentioned method of production use may, for example, be made of a suspension of sodium phenolate or sodium thiophenolate in an inert solvent such as benzene and acetonitrile.

It has been found that said phenolates and thiophenolates are well soluble in acetone. The use of acetone as a solvent yields, in general, a smooth-running reaction, which is particularly manifested in carrying out this method on an industrial scale and may be of importance.

When producing the pentachloro derivatives according to the invention it is vital that pentachlorophenol or pentachlorothiophenol, which develop a potent phytocidal activity, should be completely removed. Complete separation of pentachlorophenol or pentachlorothiophenol from pentachloro derivatives according to the invention is exceedingly difficult by fractional crystallisation from a solvent. In such a crystallisation process considerable losses of the desired product occur.

It has been found that the non-converted pentachlorophenol or pentachloro-thiophenol can be removed in a simple manner by means of a caustic soda solution or potassium hydroxide solution. For this purpose, the compound obtained according to the invention may, as it is, be washed with a dilute (preferably 0.25 N) caustic soda or potassium hydroxide solution or preferably be dissolved in a suitable non water-miscible solvent, the solution obtained being washed with dilute caustic soda solution or potassium hydroxide solution. Also when producing these other compounds according to the invention, this mode of purification of the reaction product may be used advantageously.

When using acetone as a solvent for the reaction, pentachlorophenol or pentachlorothiophenol can be removed simply by adding dilute caustic soda solution to the solution. The compound according to the invention separates out, whereas the sodium phenolate or the sodium-thiophenolate dissolves.

This novel method will now be explained with reference to the examples.

*Example I*

BIS(N.N-DIMETHYLAMIDO)PENTACHLOROPHENYL-PHOSPHATE 134 gms. (0.465 mole) of sodium phenolate were dissolved in 1 litre of acetone. After adding 85 gms. (0.50 mole) of bis(N.N-dimethylamido)phosphoryl chloride, the mixture, with stirring, was heated for 30 minutes to boiling temperature with the exclusion of air. Sodium chloride separated out. After the reaction approximately 600 ccm. of acetone was distilled off. After cooling the reaction mixture such a quantity of water (approximately 100 ccm.) was added as to dissolve all the sodium chloride. The clear solution was made alkaline until pH=10 with 2 n caustic soda lye. Subsequently 5 litres of water were added and the pH again brought to approximately 10. The bis(N.N-dimethylamido)pentachlorophenylphosphate separated out in crystalline form. After filtration and washing with water it was dried. Yield: 120 gms.=64.5%, calculated on sodium phenolate. Melting point: 144° C.

*Example II*

BIS(N.N-DIMETHYLAMIDO)PENTACHLOROPHENYL-PHOSPHATE 14.4 gms. (0.05 mole) of sodium pentachlorophenolate were suspended in 150 ccm. of acetonitrile. After adding 8.5 gms. (0.05 mole) bis(N.N-dimethylamido)phosphorylchloride the suspension, with stirring, was heated for one hour to boiling temperature with the exclusion of air. After the reaction, the sodium chloride thus formed was filtered off and the acetonitrile was evaporated. The residue was mixed with 500 ccm. of water and the pH of the mixture then brought to approximately 10. After that the separated bis(N.N-dimethylamido)pentachlorophenylphosphate was filtered off. Yield: 12 gms.=60%. Melting point: 144° C.

*Example III*

BIS(N.N-DIMETHYLAMIDO)PENTACHLOROTHIO-PHENYLPHOSPHATE 15.2 gms. (0.05 mole) of sodium pentachlorothiophenolate were suspended in 50 ccm. of anhydrous benzene and 8.7 gms. (0.05 mole) of bis(N.N-dimethylamido)phosphorylchloride. With stirring, this suspension was heated for one hour to boiling with the exclusion of air. Next, the benzene was distilled off and the residue stirred with benzene and subsequently with water. The collected liquids were introduced into a separating funnel and the benzenic solution was separated. This solution was twice washed with a little dilute caustic soda lye and once with water. After drying the solution on calcium chloride the benzene was evaporated, thus leaving a residue of 18.6 gms. of crude bis(N.N-dimethylamido)pentachlorothiophenylphosphate. Yield: 18.6 gms.=89.5%.

After crystallisation from petroleum ether (boiling range 60° C. to 80° C.) 13.0 gms.=62.5% product resulted. Melting point 133° C.

What is claimed is:
1. A compound selected from the group consisting of bis (dimethylamido) pentachlorothiolophenylphosphate and bis(dimethylamido)pentachlorophenylphosphate.
2. Bis(dimethylamido)pentachlorophenylphosphate.

3. Bis (dimethylamido) pentachlorothiolophenylphosphate.

References Cited in the file of this patent

UNITED STATES PATENTS

| | | |
|---|---|---|
| 2,552,538 | Drate et al. | May 15, 1951 |
| 2,579,434 | Kenaga | Dec. 18, 1951 |
| 2,611,729 | Bartlett | Sept. 23, 1952 |
| 2,642,406 | Dickey | June 16, 1953 |
| 2,818,406 | Short | Dec. 31, 1957 |
| 2,832,745 | Hechenbleikner | Apr. 29, 1958 |
| 2,855,426 | Kauer | Oct. 7, 1958 |
| 2,881,201 | Schrader | Apr. 7, 1959 |

FOREIGN PATENTS

| | | |
|---|---|---|
| 605,268 | Great Britain | July 20, 1948 |
| 5,595 | Japan | July 26, 1957 |